United States Patent [19]

Markson et al.

[11] Patent Number: 4,972,195
[45] Date of Patent: Nov. 20, 1990

[54] INTERFEROMETRIC LIGHTNING RANGING SYSTEM

[75] Inventors: Ralph Markson, Weston, Mass.; James W. Warwick, Boulder, Colo.; Arthur Uhlir, Jr., Weston, Mass.

[73] Assignee: Airborne Research Associates, Weston, Mass.

[21] Appl. No.: 426,507

[22] Filed: Oct. 24, 1989

Related U.S. Application Data

[63] Continuation of Ser. No. 244,092, Sep. 14, 1988, abandoned, which is a continuation of Ser. No. 897,214, Aug. 18, 1986, Pat. No. 4,801,942.

[51] Int. Cl.$^5$ .............................................. H01Q 3/00
[52] U.S. Cl. ..................................... 342/460; 342/453
[58] Field of Search ................................ 342/460, 453

[56] References Cited

U.S. PATENT DOCUMENTS

| 3,369,240 | 2/1968 | Leary . | |
|---|---|---|---|
| 3,483,559 | 12/1969 | Korzekwa et al. . | |
| 3,727,225 | 4/1973 | Adrian | 342/460 |
| 4,463,357 | 7/1984 | MacDoran | 342/460 |
| 4,543,580 | 9/1985 | Bent et al. | 342/460 |
| 4,684,951 | 8/1987 | Baumer | 342/362 |
| 4,746,924 | 5/1988 | Lightfoot | 342/453 |

OTHER PUBLICATIONS

Abramovitz, Passive Surveillance Applications of Acousto-Optic Processors, SPIE vol. 545, Optical Technology for Microwave Applications II (1985) pp. 102-107.
Abramovitz, Acousto-Optic Processors for Passive Surveillance, SPIE, vol. 519, Analog Optical Processing and Computing (1984), pp. 2-8.
"Airborne Lightning RF Direction Finding: A Feasibility Study", Craig O. Hayenga, Final Report, Air Force Geophysics Laboratory, AFGL-TR-85-0311, Nov. 1985.

*Primary Examiner*—Theodore M. Blum
*Attorney, Agent, or Firm*—Fish & Richardson

[57] ABSTRACT

The lightning range system for determining distance between a lightning discharge and an airborne object includes a receiver on the airborne object adapted to receive electromagnetic radiation signals generated by a lightning discharge along both a direct and a surface reflected path. Signal processing apparatus is interconnected with the receiver for determining the difference in the time of arrival of the direct and reflected signals. A computer is provided to calculate the range of the lightning discharge from the difference in the time of arrival of the direct and reflected signals. In a preferred embodiment, the signal processing apparatus is digital and includes at least a 10-bit analog-to-digital converter with at least a 36 megahertz sampling rate.

14 Claims, 5 Drawing Sheets

INTERFEROMETRIC LIGHTNING RANGING SYSTEM

This is a continuation of co-pending application Ser. No. 244,092 filed on Sept. 14, 1988, now abandoned, which is a continuation of Ser. No. 897,214 filed Aug. 18, 1986 now U.S. Pat. No. 4,801,942.

BACKGROUND OF THE INVENTION

The present invention relates to lightning detection, and more particularly to determining the range between an airborne object and a lightning discharge.

Thunderstorms are dangerous to aircraft because of many factors, including violent turbulence, lightning strikes to the aircraft and hail. Increasing use of modern non-conducting materials on aircraft containing sophisticated electronics and fly-by-wire control systems makes them particularly sensitive to thunderstorm electrical hazards.

At present, there are two methods for locating thunderstorms so that they may be avoided by aircraft. A traditional method for avoiding thunderstorms involves the use of radar. Radar, however, has certain inherent limitations restricting its effectiveness. While with an unobstructed view radar can see heavy rain at ranges of 100 miles or more and lighter rain when closer, radar signals are attenuated by precipitation from closer clouds which mask more distant rain. Moreover, rain per se does not necessarily imply the presence of thunderstorms, nor do all thunderclouds produce heavy rain; sometimes they produce no rain. In addition, many aircraft, military as well as civilian (particularly single engine) have no convenient location for radar antennas. Radar also requires appreciable electrical power which may not be available on smaller general aviation airplanes. Because of the relatively high expense of radar equipment, radar is not used on 95% of the approximately 200,000 general aviation light aircraft in the United States. Furthermore, the thin wings and possible use of nose compartments for armaments or electronic devices are factors which may prevent the use of radar on some military aircraft.

An alternative to radar for storm avoidance is to use radio frequency (RF) emissions from lightning for determining the occurrence and position of lightning which must be associated with thunderclouds. Approximately 10 years ago, a device known as the Stormscope was developed to present a real time display for pilots so that lightning regions could be avoided. This device uses the well-established crossed-looped sensor technique to determine the azimuth of lightning and estimates range from signal intensity. That is, the Stormscope assumes that all lightning flashes are of equal strength with range determined by the attenuation in the received signal. With this apparatus, strong flashes appear too near and weak flashes appear too far away. Both theoretical and empirical evaluations of the Stormscope indicate approximately a factor of two accuracy.

It is therefore an object of the present invention to provide a lightning ranging system having higher accuracy than the Stormscope and to eliminate the inherent limitations of radar discussed above.

It is yet another object of the invention to provide a lightning ranging system which is inexpensive as compared to radar systems.

Yet another object of the invention is lightning ranging equipment which utilizes existing electronic components.

SUMMARY OF THE INVENTION

These and other objects of the invention are achieved by a lightning ranging system for determining distance between a lightning discharge at an altitude $H_1$ and an airborne object at an altitude $H_2$ including a receiver on the airborne object adapted to receive electromagnetic radiation signals generated by a lightning discharge along both a direct and a surface reflected path. Signal processing apparatus is interconnected with the receiver for determining the difference in the time of arrival of the direct and reflected signals. A computer is provided for calculating the distance from the difference in the time of arrival of the direct and reflected signals. It is preferred that the signal processing be done digitally, utilizing a 10-bit analog-to-digital converter with a 36 megahertz sampling rate. The signal processing apparatus computes the spectrum of the received lightning discharge signal and then takes the logarithm of the spectrum. The Fourier transform of the logarithm of the spectrum is computed, the Fourier transform includes a sharp peak indicating the difference in time of arrival. The difference in time of arrival is then used to calculate the distance from the airborne object to the lightning discharge.

BRIEF DESCRIPTION OF THE DRAWING

The invention disclosed herein will be understood better with reference to the drawing of which:

FIGS. 4a and 4b are graphs of range versus echo/direct power;

DESCRIPTION OF THE PREFERRED EMBODIMENT

The present invention determines the range of a lightning flash by detecting the difference in the time of arrival of the direct and reflected electromagnetic signals from the lightning discharge. This "single station" approach is useful when there is insufficient separation available for cross bearings utilizing two or more antennas. For example, it could be used from a satellite, a mountain peak, a tall building or a ship with a sufficiently tall superstructure or mast. Alternatively, a kite or balloon deployed from a ship or ground station could carry a sensor aloft to provide sufficient vertical separation to utilize the proposed ranging technique. The features of the ranging technique will first be described qualitatively. To a great extent, the qualitative description relies upon quantitative calculations which will be presented later. Geometric factors enter first of all in the time difference that is the basis for ranging. They are also involved, along with electromagnetic factors, in the relative strength of the direct and reflected signals. In turn, the time difference and the signal strength determine the specifications for the electronic system.

As stated above, the present invention utilizes a signal reflected from the earth's surface in comparison with the direct signal to infer range. The present method may be used both over sea and over land, although the reflected signal from the sea is much stronger. The sea is a remarkably good mirror for radio waves. The dielectric constant of water is 80 at radio frequencies (in contrast to a value of 1.8 at optical frequencies) and is mainly responsible for the remarkable reflectivity. The conductivity of sea water further improves the reflectivity, but that improvement would not be necessary for the method to be applicable over large bodies of fresh water.

The intrinsic reflectivity of land is generally fairly good and the present method does not require the extraordinarily high reflectivity of water. The main limitation for use over land is roughness of terrain, which can greatly exceed that of the ocean.

Historically, the specular reflection of radio waves from the sea has been more of a hindrance than a help to communication in naval aviation. The interference of direct and reflected waves causes multipath fading in conventional narrow band radiotelephone or radiotelegraph systems. The problem is serious enough in ship-to-air communication, but is so marked in air-to-air communication to be called "radio holes". The present invention uses this heretofore troublesome interference effect for lightning ranging. In order to utilize this effect, a wide enough frequency band to encompass destructive and constructive interference several times must be received. The bandwidths that calculations show to be necessary are not especially demanding upon modern electronics technology, being similar to those used in television receivers.

The reflectivity of sea water is always lower for polarization with a vertical electric field than for horizontal polarization. Were it not for the conductivity provided by its salt content, the reflection for vertical polarization would go down to zero at an angle of incidence (the Brewster angle) within the range of interest for the present invention. These predictions of electromagnetic theory have been validated experimentally for the design of naval avaiation radio, for which vertical polarization is therefore preferred, to reduce the severity of multipath effects. Conversely, horizontal polarization seems preferable for a lightning ranging system based on reflection. Further, horizontal polarization should favor the more frequent intra-cloud discharges, relative to the less frequent cloud-to-ground and cloud-to-sea discharges. Another advantage of horizontal polarization is discrimination against vertically polarized communications signals.

As will become clear below, the longer the range to a lightning discharge, the shorter will be the time difference between reception of the direct and reflected signal. This relationship is in the opposite direction of the range-time relationship in radar. The time difference in nanoseconds is substantially equal to the difference in the lengths of the direct and reflected paths, in feet, because the refractive index of air is not much different from that of free space (where one foot corresponds to 1.02 nanoseconds).

Nevertheless, the slight decrease with altitude of the refractive index of the atmosphere does have a significant effect. This decrease causes radio waves to travel in curved paths while in the atmosphere. This effect is approximately allowed for by using a fictitious radius for the earth: usually taken to be 4/3 of the actual radius. One then can represent radio rays by straight lines in geometric calculations. Calculations have shown that multipath effects from the ionosphere does not degrade performance of the present system.

The reflectivity of the sea is extremely high for all radio frequencies under consideration. Frequency, however, is very much a factor in assessing the effect of ocean waves. The lower the frequency, the longer the radio wavelength and the less the effect of sea waves. However, the impairment of reflectivity is less than one might expect from the comparison of wave height to radio wavelength. When the grazing angle is small, the effect of sea waves on reflectivity is greatly diminished. Small grazing angles prevail for the longest ranges. (The grazing angle is the angle between the ray and the plane of the reflecting surface; that is, the tangent plane if the surface is curved. In other words, the grazing angle is the complement of the angle of incidence measured between the ray and the normal to the surface.)

Signal processing to determine the time difference seems simpler in concept when the original signal spectrum does not vary widely over the band that is measured. The desirable condition is favored by keeping the relative bandwidth small. A 6 MHz band around 60 MHz is an example. The center frequency is not critical and it would not be costly to provide selectable frequencies to avoid particularly strong man-made interference.

A smoothly-varying signal spectrum can be undone by nonuniform response of the antenna. Making the center frequency much larger than the bandwidth eases the antenna design problem, while offering a choice of frequencies increases the problem. It would be possible to calibrate the system with reference to a standard spark. The ability to store such a calibration and to apply it as a correction is one of the advantages of digital processing.

The convex sphericity of the earth's surface causes the reflected wave to diverge and thereby be reduced in intensity. This effect is largest for small grazing angles; that is, for the longest ranges. The relative intensity of the reflected wave is also slightly reduced because of its longer length compared to the direct path; this effect has been included in the calculations but is not very important in cases of interest.

As will be discussed further below, a critical component in the system of the present invention is the analog-to-digital converter (ADC). Because lightning signals are quite strong, the round-off error of the ADC may be the principle source of "noise". At the same time, the ADC must sample fast enough to encompass the needed bandwidth to identify clearly the interference pattern between the direct and reflected signals. These requirements combine to determine the feasibility of using an ADC to permit digital signal processing. The receiver specifications for use in the present invention have much in common with those of a conventional television receiver. This fact is expected to lead to significant economies through use of components that are already in mass production. Of course, some additions and modifications are needed as will be discussed hereinbelow. Protection against gross electrical overloads is important. Compression of strong but useful signals is expected to ease the requirements of the ADC, but must not introduce irreversible distortion. The compression contemplated herein would supplant the slower-acting automatic gain control used in television receivers.

The time difference between the directly transmitted electromagnetic radiation and the radiation that is reflected from the earth's surface from a lightning discharge, the fundamental indicator of the lightning range as disclosed herein, will now be discussed. The time difference in nanoseconds is practically equal to the difference in the length of the two paths in feet. The fact that the refractive index of air is slightly greater than unity is of negligible consequence in this relation and the reflection from the surface can be assumed to take place without delay.

The gradient in the refractive index of the atmosphere is of some significance because the ray paths will be curved. The use of an artificial earth radius of 4/3 of its actual value is conventional and is adopted here. This correction is not critical in this application and the reason can best be explained by contrast to those applications where it is sometimes not accurate enough to assume a 4/3 earth radius. For example, communication by narrowly focused beams of microwaves or light may require careful aiming to cause the strongest part of the transmitted beam to be intercepted by the receiving aperture. If atmospheric changes cause a different degree of bending, the signal could be lost entirely. Lightning emits radio waves strongly in all direction, so that the only effect of an aberrant refractive-index profile would be a minor error in the range estimate.

Figure 1:
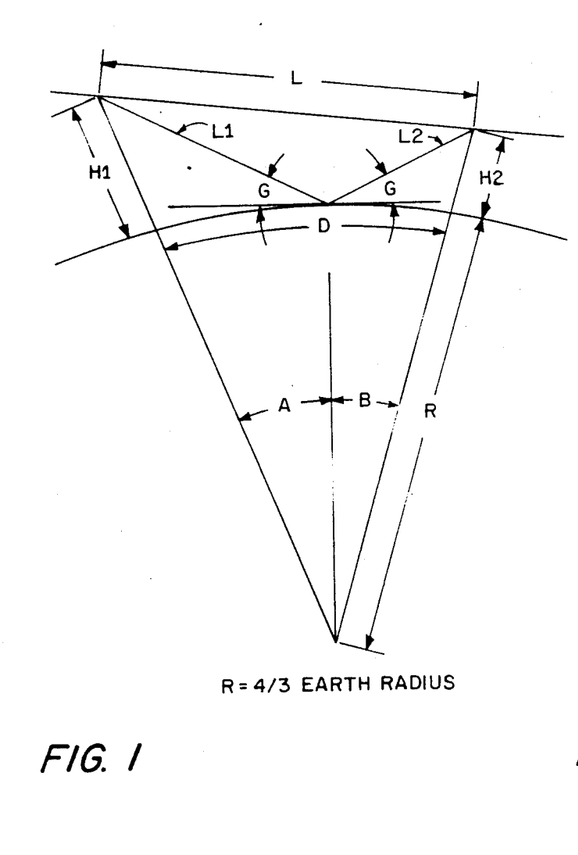
FIG. 1 is a schematic illustration of the geometry for path difference determination.

The geometry of the path difference calculation is shown in FIG. 1. In FIG. 1, H1 is the height of the lightning discharge source and H2 is the height of the airborne object. In this figure, R is chosen to be 4/3 of actual earth radius as discussed above. The range L shown in FIG. 1 is computed by means of the computer program attached hereto as Appendix A. The main check on the correctness of the calculation of the program in Appendix A comes from the approximate formula Approximate Path Difference=2*H1*H2/D.

This formula is based upon a flat earth and therefore becomes inaccurate at long ranges. It uses approximations to the trigonometric functions and for this reason also becomes inaccurate at very short ranges. This quantity is calculated in the computer program of Appendix A as the variable P9.

Figure 2:
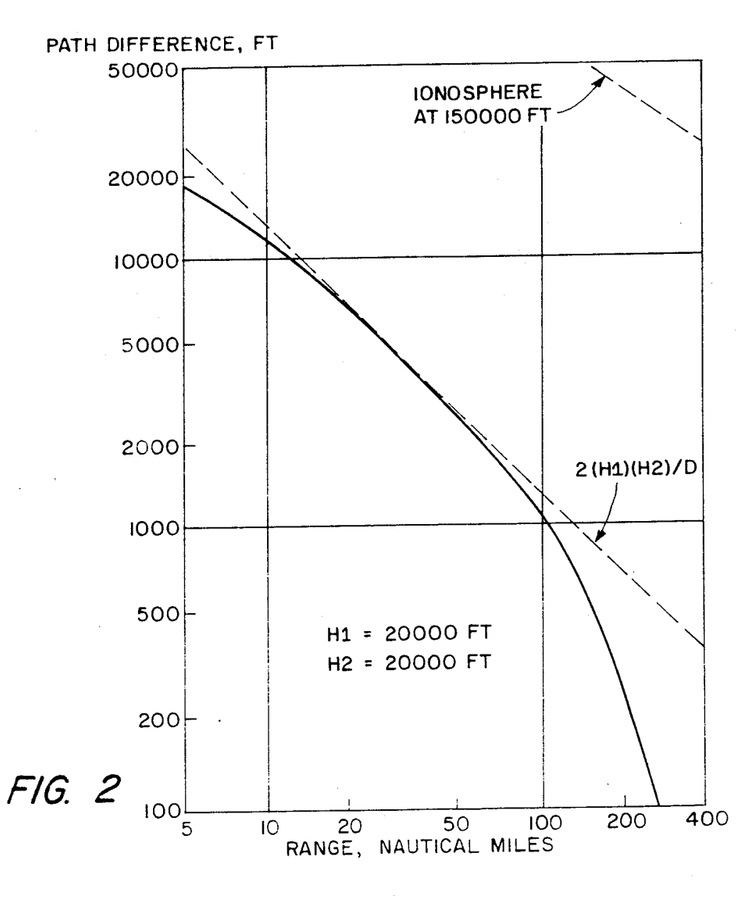
FIGS. 2 and 3 are graphs of range versus path difference.

The more accurate path difference P0 is calculated in the program of Appendix A in accordance with the geometry shown in FIG. 1, including the use of the 4/3 earth radius. Results for P0 are given as the solid curve in FIGS. 2 and 3, for sample cases. The approximate path difference P9 is also shown as a broken line and corresponds closely to the more accurate calculation for intermediate ranges of 10-100 miles, for these typical altitudes. The more accurate calculation exhibits the phenomenon of a radio horizon, where the path difference vanishes, at ranges of about 300 miles for these examples.

The computer program of Appendix A will compute the more accurate path difference P0 when H1 and H2 are known and the time of arrival difference is also determined. The height H2 of the airborne object will be known from instruments on the aircraft such as its altimeter. When the aircraft is above land accound will also have to be taken of the terrain height variations. The height, H1, of the lightning discharge must also be known, and can be estimated from climatological data, the routine radiosonde balloon soundings obtained by the Weather Services of the United States and other countries, and further refined from the prevailing meterological data available from onboard instruments. The radiosonde data is available for all parts of the United States and much of the world and pilots can obtain the local temperature profiles over the radio. Furthermore, thunderstorm research during the last decade indicates that most of the negative space charge in a thundercloud is confined to a relatively thin layer in the $-10°$ to $-20°$ C. range regardless of height above the ground or location. This may be due to the presence of mixed phase hydrometeors (supercooled water and ice) in a relatively thin horizontal layer; several of the most prominent electrification mechanisms depend on the presence of mixed phase or partially frozen ice pellets. It is also reported that most lightning is located or originates within this temperature regime.

Thus, knowledge of the atmospheric temperature structure may allow a more accurate than previously expected estimate of the height of the lightning RF source. The atmospheric temperature profile will be known as described above. Lightning source and airplane heights can be inputted to the device by the pilot. If desired, these quantities can also be inputted automatically using information from the aircraft's altimeter and a temperature sensor with appropriate software. To summarize, the height of the airplane is known from the airplane's altimeter. The height of the lightning discharge, H1, is estimated from the atmospheric temperature profile. The remaining quantity needed in the computer program of Appendix A for computing range is the difference in time of arrival between the direct and reflected path signals, which will be discussed in the remainder of this specification.

Figures 3, 4:
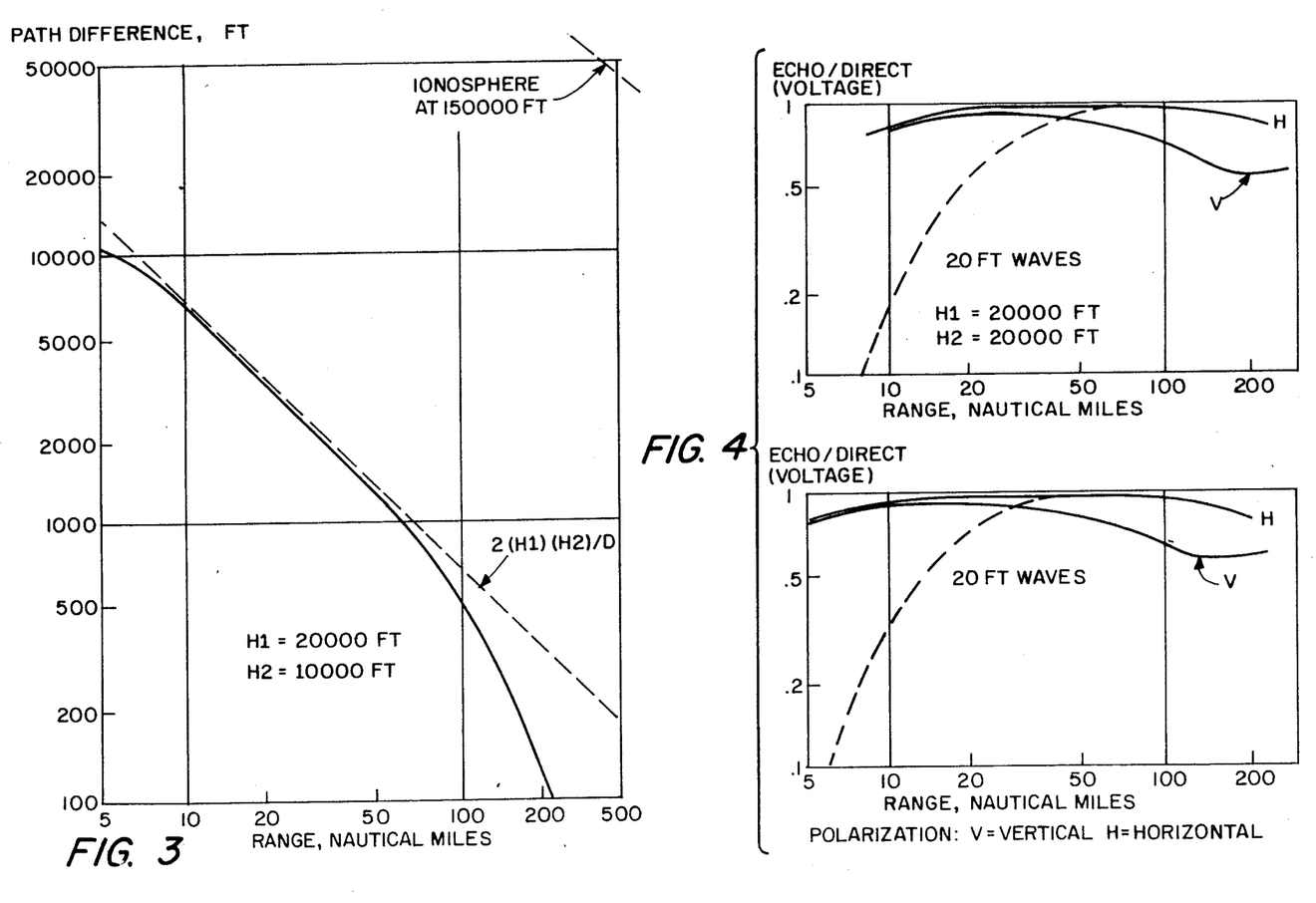

When the ranging system of the present invention is utilized over the ocean, the effect of ocean waves on the strength of the reflected signal must be considered. One expects the sea to be smooth enough for specular reflection when the waves are smaller than the wavelength of the radiation, but the situation is more favorable than that, for the present application. For small grazing angles, the effect of waves is proportionately reduced. The description of waves is itself problematical. It is commonplace to report the peak-to-trough height estimated visually. The computer program in Appendix A converts the peak-to-trough wave height W1 in feet to an rms wave height W in meters. The peak-to-trough height is supposed to be 4.66 times the rms value. Then the expression $$O2 = e - \left( \frac{(4\pi W \sin(G))}{\lambda} \right)^2$$

is taken as the factor by which the reflected power is reduced by the waves. Here $\lambda$ is the radio wavelength. The presence of the sine of the grazing angle G is most significant. It shows that the waves have the least effect when the grazing angle is small, that is, for the longest ranges. In FIG. 4, a dashed line shows the results of applying the ocean-wave factor to the horizontal polarization reflectivity, after that is corrected for divergence and ratio of path lengths.

Divergence is another factor which the computer program of Appendix A takes into account. A sperical reflector functions like a diverging lens and reduces the intensity of the reflection. In radio propagation, this reduction factor is called divergence. It has the largest effect for small grazing angles and is calculated by the approximate formula, $$D1 = 1/SQR(1 + 2*R1*R2/(D*R*TAN(G))).$$

The reflectivity, wave effect and divergence are power ratios. When they are multiplied together, they give the factor by which the reflected wave power is expected to be dimished in comparison to the direct power. The square root of this power ratio is taken to give the voltage ratio A1. The value of A1 is plotted in FIGS. 4a and 4b for the two cases considered in FIGS. 2 and 3.

One can see that the reflected signal will be relatively very strong unless one is dealing with a rough sea and ranges that may be shorter than need be considered. The impairment by waves is significant only if they are high over a large area; a few very strong waves will not much reduce the total reflected power.

Antenna considerations for the present invention will now be discussed. A simple way to get uniform azimuthal response to horizontal polarization is to use a loop lying in the horizontal plane. A horizontal loop also has an agreeable vertical pattern, in that its gain is largest for the smallest grazing angles, which would be encountered for the most distant lightning. However, alternative antenna designs, such as combinations of horizontal monopoles or dipoles, could probably be arranged to give adequate azimuthal coverage for the ranging function if there were aerodynamic reasons for doing so. Placement of the ranging antenna underneath the aircraft seems natural and would discriminate against signals reflected from the ionosphere.

Referring once again to FIGS. 2 and 3, one can see that a useful lightning ranging instrument should be able to deal with path time differences in the range of 0.5 to 10 microseconds (path differences of 500 to 10,000 feet). Range can be extended to 150 miles or more by evaluating path differences as short as 0.2 microseconds.

The spectrum of the signal produced by lightning is not flat. The signal is strongest at low radio frequencies and decreases (for equal bandwidth) as frequency is increased. The spectrum will be relatively more constant over a specified bandwidth, the higher the frequency. It is easier to make a suitable antenna the higher the frequency (i.e., when the relative bandwidth is smaller).

Figure 5A:
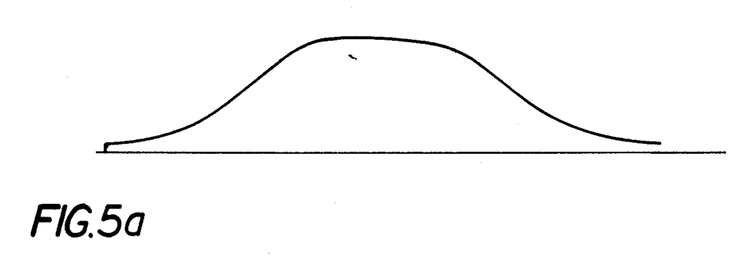
FIGS. 5a, b and c are power spectra of the combined direct and reflected signal.
Figure 5B:
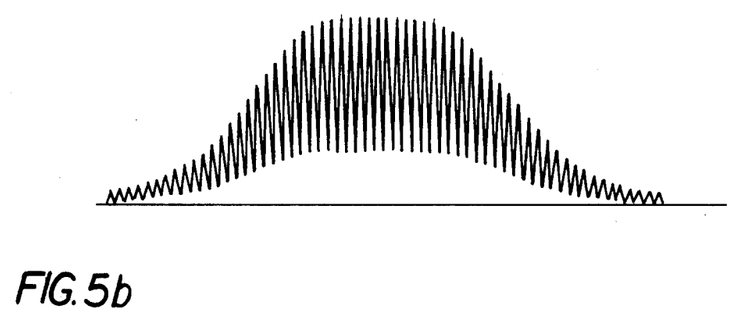
Figure 5C:
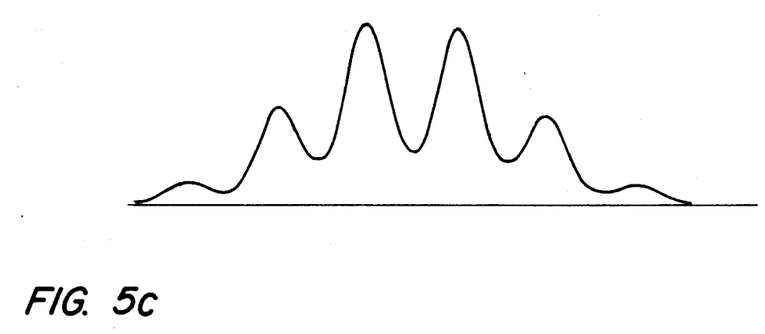

A reasonably flat signal spectrum is needed because there is no way of knowing exactly the signal originally radiated from the lightning discharge. If the intrinsic spectrum can be depended upon to be smooth, one can accurately estimate the path difference from the ripples it introduces into the spectrum. Suppose, for example, that a 6 MHz band centered at 60 MHz is received. The relative bandwidth thus would be 10 percent. If the signal power varies as 1/f, the spectrum would look like FIG. 5a in the absence of a reflection. With an echo time delay of 5 microseconds, the spectrum would look that of FIG. 5b; an echo time of 0.5 microseconds would give a received spectrum has shown in FIG. 5c. The spacing of the ripples in frequency obviously permit the 5 microsecond time to be determined accurately and unequivocally. A reasonable observer could also be sure enough about the 0.5 microsecond time difference. But it is apparent that convincing evaluation of a 0.2 microsecond time difference would call for a more sophisticated analysis or a wider bandwidth.

Figure 7:
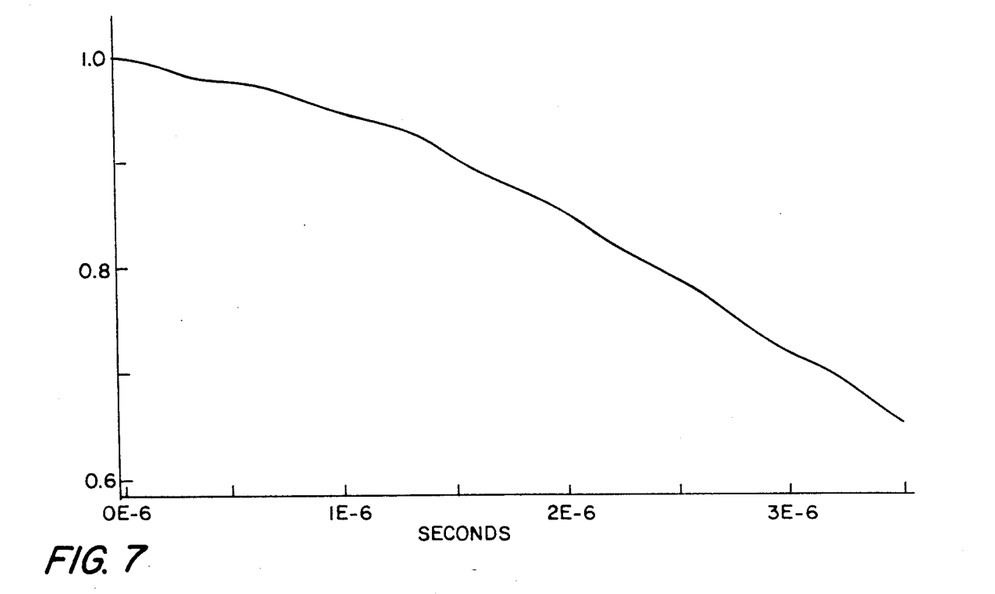
FIG. 7 is a graph of the autocorrelation function of lightning with an artificial 0.2 microsecond delay.

The autocorrelation function and the power spectrum are Fourier transform pairs, so that they should contain equivalent information. But there are important differences in the way they contain this information. The autocorrelation function has a very strong ability to smooth over irregularities in the signal. Possibly the slight waviness in the autocorrelation function (FIG. 7) could be analyzed to extract the time delay.

The spectrum, on the other hand, establishes a better distinction between the echo and the extraneous features, so that the latter can be filtered out. Thus, processing involving spectrum calculation seems desirable and conversion of the signal to digital form seems to be the surest way to accomplish the processing. Furthermore, important additional benefits can be realized through the versatility of digital processing.

An attractive way of extracting the time delay has been given the name "cepstrum" (from "spectrum" partly turned around). After the spectrum is computed, its logarithm is taken and then another Fourier transform is taken. Echos stand out as sharp peaks in the second transform, provided that the signal-to-noise ratio of the original signal is high enough. Just how high will be considered below.

It should be noted that yet another logarithmic operation may be employed. An analog logarithmic operation on the incoming signal will be advantageous in reducing the dynamic range that subsequent stages have to accommodate. Such an analog compression before conversion to digital form does not supplant the subsequent logarithmic operation in the frequency domain in the calculation of the cepstrum; it eases the resolution demands on the analog-to-digital converter.

The signal-to-noise requirements for extracting time delays by cepstrum processing indicate that good results are possible down to an SNR of 0 dB or even lower when suitable windows (filters) are used for the characteristics of the signal and noise. In general, the bandwidth should be at least several times the reciprocal of the time delay, as one would expect from FIG. 5.

The design of a signal-to-noise ratio of at least 10 dB and preferably 20 dB will be as close to being correct as any estimate that can be made of SNR. The time window should minimize the intake of noise when there is no signal but must not unfairly abbreviate the delay signal relative to the direct signal.

Because lightning is a strong signal, the truncation error of the analog-to-digital converter (ADC) can be the dominant signal uncertainty or "noise". Thermal noise is not likely to be important and receiver noise can be made even smaller than thermal noise. The ADC "noise" is largely a question of the cost of the converter.

The sampling rate required for the system of the present invention follows rather directly from the desire to measure time delays down to 0.5 microseconds. The corresponding fringes in the power spectrum will have a spacing of 2 MHz and at least three complete fringes seems to be an ungenerous but tolerable minimum number of fringes upon which to base the determination. Thus, a signal bandwidth of 6 MHz is specified. The sampling theorem requires a minimum sampling rate of 12 megasamples per second, but all experience teaches that a liberal factor of safety is needed to obtain sound results in the presence of significant noise. Therefore, a sampling rate of 36 Ms/s is preferred.

This factor of safety and sampling rate is a primal requirement for having data worth processing. For a given sampling rate, the cost of the analog-to-digital converter rises rapidly with the number of bits of accurate resolution that it must provide. An estimate of this resolution will now be made.

If all direct signals had the same magnitude, the signal-to-noise power ratio for the echo would be approximately $(2^n)^2$, reduced further by the square of Al (the relative strength of the echo, if not substantially equal to unity), where n is the number of bits. Although a 20 dB signal-to-noise ratio should be sufficient when the signal has the optimum amplitude, it is probably necessary to allow another 30 dB for signal level variations even when a compressive circuit precedes the ADC. Another 10 dB is appropriate to allow for fairly strong waves (i.e., Al=0.32). The total is 60 dB, so that the above quantity should be set equal to one million.

The solution in this case for n is 10 bits. Thus, a 10-bit ADC with a 36 MHz sampling rate is preferred. Single chips with this capability are becoming available at gradually decreasing prices.

A memory-less logarithmic amplifier characteristic is obtainable at these frequencies by placing Schottky-diode limiters between some of the final gain stages preceding the ADC. Logarithmic amplifiers using available fast transistors could accomplish the compression with sufficiently low distortion. The anticipated signals will vary enough in strength from variations in distance to make this compression of dynamic range appropriate. By reducing the dynamic range from 30 dB to 10 dB, one might hope to increase the signal-to-noise ratio sufficiently to permit much swifter short cuts in place of the cepstrum processing.

Figure 6:
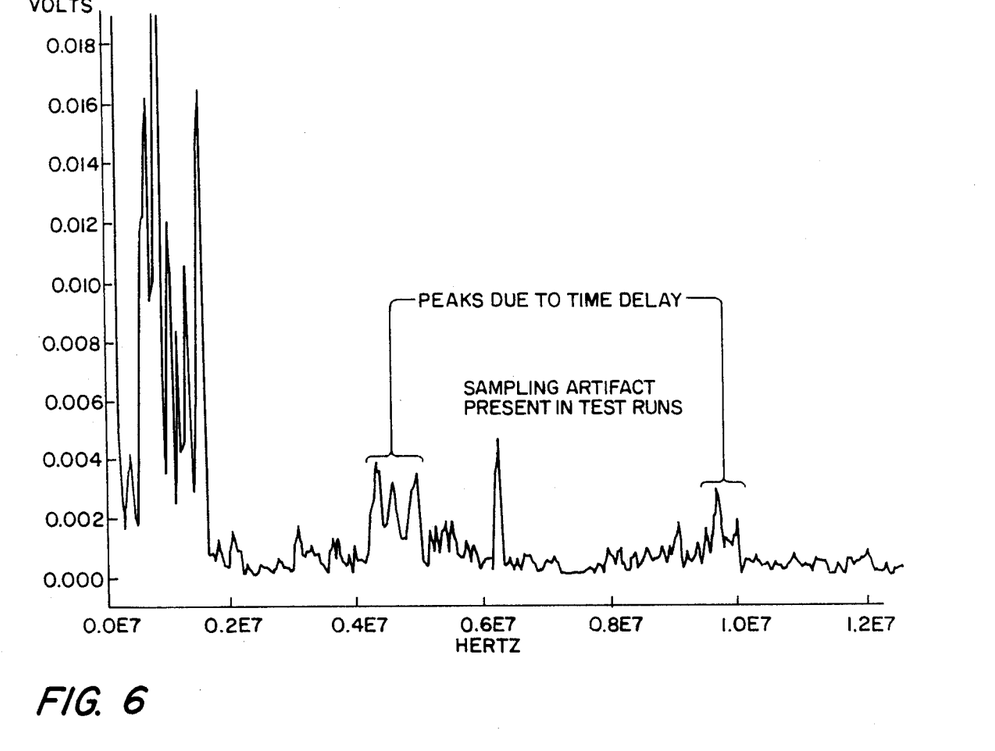
FIG. 6 is a graph of baseband spectrum of lightning with an artificial 0.2 microsecond delay.

Experiments have been conducted on natural lightning utilizing a ground-based antenna incorporating a delay line to introduce a path difference of 0.2 microseconds. The spectrum of the combined signal clearly reveals the presence of the multipath, as shown in FIG. 6. The spectrum has substantial power frequencies irrelevant to the intentional multipath, but the spectrum analysis segregates the interferring signals (which dominate the raw waveform) from the desired signal that appears at the expected frequencies of 5 MHz and 10 MHz, which will indicate a time delay of 0.2 microseconds after a further Fourier transform in accordance with the cepstrum prescription. The peak at 6 MHz is a systematic artifact of the system (present in the absence of time delay). Such an artifact can be removed digitally at this stage on the basis of prior calibration.

As stated above, the autocorrelation function theoretically contains exactly the same information as the power spectrum. However, the autocorrelation calculation on the same stored waveform utilized in FIG. 6 lacks distinctive features that can be attributed to the multipath. The autocorrelation calculation produces a very sharply defined result, so that the minor waves in the curve of FIG. 7 may in principle contain extractable information on both the echo and the interference.

The electronics of the system of the present invention include a receiver, signal processing equipment, and display. It is likely that the receiver will be analog in its first stages and that the signal processing will at some point become digital. A way to obtain an inexpensive receiver with about the right signal bandwidth and more than the required tunability is to use the receiver components mass-produced for television and videotape recorders. Television uses vestigial-sideband reduced-carrier modulation. The reduced carrier is, nevertheless, the most prominent characteristic of the received signal as viewed on a spectrum analyzer and is necessary for the operation of the detector that converts the intermediate frequency signal to the baseband video signal. Lightning does not come with a carrier. This condition can be dealt with by adding a carrier, generated by a local oscilator, at almost any point up to the input to the detector. The television interface of a personal computer provides enough carrier power to activate the detector. Alternatively, the detector could be replaced by a true mixer to shift the received signal to or near baseband. A second local oscilator would still be required. Either arrangement is capable of preserving the echo information.

Signal processing will operate on the baseband signal. In theory, the bandlimited signal could be sampled directly, without conversion to baseband, but such an arrangement would place excessive demands on the perfection of the sampling characteristics of the ADC.

Figure 8:
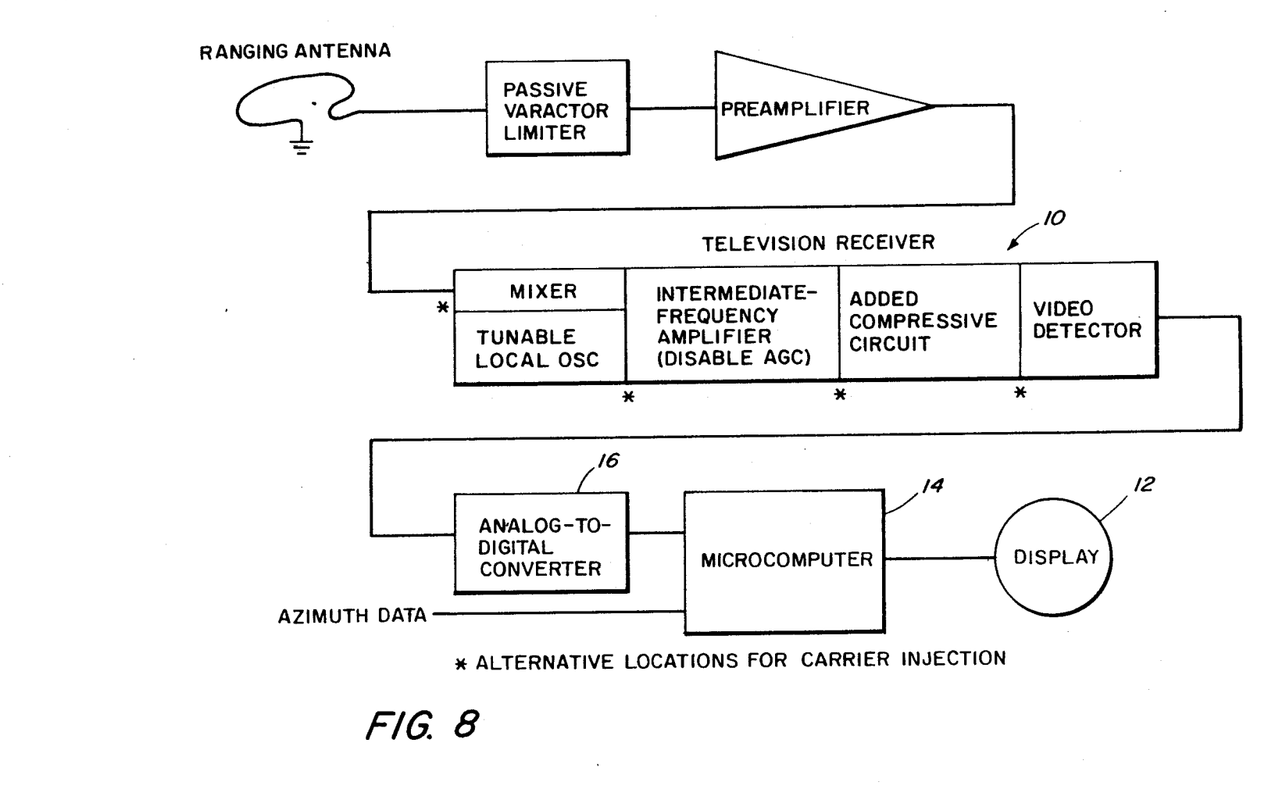
FIG. 8 is a block diagram of the interferometric lightning ranging system disclosed herein.

A block diagram of the system of the present invention is shown in FIG. 8. A combined block 10 of mixer, tunable local oscillator, intermediate-frequency amplifier, and detector is the front end of a television receiver. One might even consider using the picture tube and deflection circuits of a small screen television set as a display unit 12. In effect, the signal is detoured through a computer, the arrangement otherwise resembling a television set. It is unlikely that the limiter, the preamplifier, and the compressive circuit will be adapted from television accessories; suitable circuits can be constructed from inexpensive semiconductor devices.

The use of digital processing permits the characteristics of a simple diode compression circuit to be stored and allowed for in the calculations. The microcomputer 14 may either be a complete system for prototype testing or simply microprocessor chips which would not need keyboards or disc drives. Experiments have shown that very satisfactory analog-to-digital conversion is technically possible in reasonably small packages. Generally, requirements for many bits of resolution greatly increase the cost of the analog-to-digital converter 16. Analog compression before the ADC 16 is expected to keep the bit requirements from expanding unduly as signals of widely varying strengths are encountered. The ADC 16 requires resolution, speed and reasonable monotonicity, but not absolute accuracy because consistent errors can be accounted for in the same way that allowances made for the characteristics of the analog compressive circuits.

The bandwidth required to derive lightning range by multipath interference is comparable to that used in television. The interference effect that is exploited in this determination would be very pronounced over water. When the water is the sea, the altitude of the reflecting surface will be known exceedingly well and the altitude of the aircraft should be known with good accuracy. The approximate formula for range has been shown to hold well enough over most of the ranges of interest to be used for error estimation. It indicates that the relative error in range will be essentially the same as the relative error in estimating the height of the cloud discharge.

As stated above, the height of the lightning source can be estimated before a flight from climatological data and it is expected that this estimate can be further refined in real time from the prevailing meteorological data available from the routine radiosonde measurements and on-board instruments.

The interference effect will not be as strong over land and the altitude of the reflecting land surface will be needed to compute the range. This information is available to the pilot and can be entered into the instrument.

It is thus seen that the objects of this invention have been achieved in that there has been disclosed a lightning ranging system for estimating the distance from an airborne or elevated object to a lightning discharge utilizing but a single antenna. The spectrum of the received direct/reflected path signal is analyzed (cepstrum processing) to determine the time delay between the direct and reflected signals. This time delay along with the altitudes of the lightning discharge and the airborne object, are utilized to compute the range to the lightning discharge with the program of Appendix A. The bandwidth requirements of the present system are such that conventional television components can be utilized. The present system eliminates the inherent limitations both of radar and of the known Stormscope device.

It is recognized that modifications and variations of the present invention will occur to those skilled in the art and it is intended that all such modifications and variations be included within the scope of the appended claims.

APPENDIX A: PROGRAM FOR PROPAGATION CALCULATIONS

The variables used to represent quantities in the program are defined in the program. They are single characters followed (at most) by a single number. This restriction makes them acceptable to any BASIC interpreter. However, it also makes them harder to identify, so a table of symbols is given below in addition to the identification in program remarks.

The program is written in BASIC which differs from ANSI standard minimal BASIC in having more than one statement on some of the lines, with a colon as a separator. It will run as written on most personal computers, including all Commodore models before the Amiga. Some Hewlett-Packard BASICs require a "@" in place of the colon and VAX/VMS BASIC calls for a back-slash instead of a colon.

Enough unused line numbers are present so that the program can be written with one statement per line, as required for some versions of BASIC.

Statements can be added in the usual way to cause the calculation to loop on successive values of grazing angle and other variables. Also, additional statements are usually needed to direct the output to a printer. The print statements can be rewritten to produce tables in any desired form.

The calculations are sufficiently rapid that there is little advantage in bypassing the calculation of results that are not wanted in a table, especially in view of the fact that some of the calculated quantities are used in subsequent calculations.

"Scratch variables" are intermediates in calculations and are the only ones that may be reused; all of the others retain their assigned values. Range is converted to nautical miles in the PRINT statement.

| | Symbol Table |
|---|---|
| A | radians on 4/3 earth from source to reflection point |
| A1 | magnitude of reflection, horizontal polarization, smooth sea. |
| A2 | ibid., rough sea |
| A3 | ibid., vertical polarization, smooth sea |
| A4 | ibid., rough sea (nominal, not plotted) |
| B | radians on 4/3 earth from reflection point to receiver |
| C | cosine of the grazing angle |
| D | range at sea level, feet |
| D1 | divergence power reduction factor |
| E1 | relative dielectric constant of sea water (real part) |
| F | frequency in megahertz |
| G | grazing angle in radians |
| G1 | grazing angle in degrees |
| H | average height of source and receiver, feet |
| H1 | height of source, feet |
| H2 | height of receiver, feet |
| I0 | ionospheric reflection path difference, feet |
| I9 | ionospheric height, feet |
| L | direct path from source to receiver over 4/3 earth, feet |
| N | half-angle of range on true earth radians |
| O | scratch variable |
| O2 | roughness factor, power ratio |
| P | scratch variable |
| P0 | path difference, feet |
| P9 | approximate path difference, feet |
| Q | scratch variable |
| R | 4/3 earth radius, feet |
| R0 | true earth radius, feet |
| R1 | path length from source to reflection point, feet |
| R2 | path length from reflection point to receiver, feet |
| S | sine of the grazing angle |
| S1 | conductivity of the sea, mhos/meter |
| U,V | scratch variables |
| W1 | peak-to trough wave height, feet |
| W | root-mean-square wave height, meters |
| X,Y | scratch variables |
| 10 | REM PATH DIFFERENCES AND PROPAGATION CALCULATIONS |
| 110 | P5 = 1.57079633:REM PI/2 |
| 120 | R = 5280^2:R0 = .75*R:REM 4/3 & 1.0 EARTH RADII, FT |
| 130 | E1 = 80: REM DIELECTRIC CONSTANT |
| 140 | S1 = 4: REM CONDUCTIVITY, MHOS/M |

-continued

Symbol Table

| | |
|---|---|
| 160 | F = 60:REM FREQUENCY, MHZ |
| 170 | W1 = 20:REM PEAK-TO-TROUGH WAVE HEIGHT, FT |
| 180 | I9 = 2E5: REM IONOSPHERE HEIGHT, FT |
| 190 | : |
| 200 | G1 = 6:REM GRAZING ANGLE, DEGREES |
| 210 | G = P5*G1/90:C = COS(G):S = SIN(G) |
| 220 | REM ROUGHNESS FACTOR, POWER RATIO |
| 230 | W = .0644*W1:O = 8*P5*S*W*F/300:O2 = EXP(−O^2) |
| 240 | : |
| 250 | REM REFLECTIVITY, POWER RATIO |
| 260 | X = 18000*S1/F:Y = E1-C*C |
| 270 | P = SQR(Y*Y + X*X):Q = S*SQR(2*(Y + P)) |
| 280 | P = P + S*S:G2 = (P − Q)/(P + Q): REM HORIZ. POL. |
| 285 | U = (E1*E1 + X*X)*S + P/S |
| 290 | V = E1*SQR(2*(P + Y)) + X*SQR(2*(P− Y)) |
| 295 | G3 = SQR((U − V)/(U + V)):REM VERT. POL. |
| 300 | : |
| 310 | H1 = 20000:H2 = 20000:REM SOURCE AND RECEIVER HEIGHTS, FT |
| 315 | : |
| 320 | REM RANGE D AND PATH DIFFERENCE P0, FT |
| 330 | Y = C/(1 + H1/R):X = SQR(1 − y^2):A = P5 − G − ATN(Y/X) |
| 350 | R1 = SIN(A)*(R + H1)/C |
| 360 | Y = C/(1 + H2/R):X = SQR(1 − y^2)):B = P5 − G − ATN(Y/X) |
| 380 | R2 = SIN(B)*(R + H2)/C |
| 390 | L = ((R + H1)*COS(A) − (R + H2)*COS(B))^2 |
| 400 | L = SQR(L + ((R + H1)*SIN(A) + (R + H2)*SIN(B))^2) |
| 410 | P0 = R1 + R2 − L:D = (A + B)*R |
| 450 | : |
| 460 | P9 = 2*H1*H2/D:REM APPROX. PATH DIFF., FT. |
| 500 | : |
| 510 | D1 = 1/SQR(1 + 2*R1*R2*C/D/R/S):REM DIVERGENCE FACTOR |
| 515 | : |
| 520 | REM VOLTAGE REFLECTION FACTOR |
| 530 | A1 = SQR(D1*G2)/(1 + P0/L):A2 = A1*SQR(O2):REM HORIZ. POL. |
| 532 | A3 = SQR(D1*G3)/(1 + P0/L):A4 = A3*SQR(O2):REM VERT. POL. |
| 540 | : |
| 550 | H = (H1 + H2)/2:N = D/R0/2 |
| 560 | U = (R0 + H)*SIN(N):V = I9 + R0*(1 − COS(N)) |
| 570 | I0 = 2*(SQR(V*V + U*U) − U):REM IONOSPHERIC PATH DIFF., FT. |
| 600 | PRINT "GRAZING ANGLE, H1 ,H2 = ";G1;H1,H2 |
| 700 | PRINT "PATH DIFF, FT = ";INT(P0 + .5) |
| 710 | PRINT "RANGE,NM = ";.1*INT(D/607.6) |
| 720 | PRINT "DIVERGENCE FACTOR = ";.0001*INT(10000*D1) |
| 730 | PRINT "REFLEC. PWR. COEF (H) = ";.0001*INT(10000*G2) |
| 735 | PRINT "REFLEC. PWR. COEF (V) = ";.0001*INT(10000*G3) |
| 740 | PRINT "SMOOTH ECHO VOLTAGE RATIO (H) = ";/.0001*INT(10000.A1) |
| 745 | PRINT "SMOOTH ECHO VOLTAGE RATIO (V) = ";.0001*INT(10000*A3) |
| 750 | PRINT "ROUGHNESS FACTOR FOR";W1;"FT WAVES = ";.0001*INT(10000*O2) |
| 760 | PRINT "ROUGH ECHO VOLTAGE RATIO (H) = ";.0001*INT(10000*A2) |
| 765 | PRINT "ROUGH ECHO VOLTAGE RATIO (V) = ";.0001*IONT(10000*A4) |
| 770 | PRINT "APPROX. PATH DIFF., FT = ";INT(P9 + .5) |
| 780 | PRINT "IONOSPHERIC DELAY, FT = "; INT(I0) |
| 800 | PRINT:END |
| READY. | |

What is claimed is:

1. Interferometeric lightning ranging system for determining distance between a lightning discharge at a first altitude and an airborne or elevated object at a second altitude comprising:
 a receiver on the object adapted to receive electromagnetic radiation signals generated by a lightning discharge along both a direct and an earth's surface reflected path;
 signal processing means interconnected with the receiver for determining the difference in time of arrival of the direct and reflected signals; and
 computing means for calculating the distance from the difference in the time of arrival of the direct and reflected signals.

2. The system of claim 1 wherein the signal processing means is adapted to analyze ripples in the spectrum of the received signal, the spacing of the ripples being an indication of the difference in the time of arrival.

3. The system of claim 2 wherein the signal processing means is digital.

4. The system of claim 3 wherein the signal processing means includes an analog-to-digital converter.

5. The system of claim 3 in which the signal processing means includes means to:
 (1) compute the spectrum;
 (2) take the logarithm of the spectrum; and
 (3) take the Fourier transform of the logarithm of the spectrum, the Fourier transform including sharp peaks indicating the difference in time of arrival.

6. The system of claim 4 wherein an analog signal compression operation precedes conversion to digital form in the analog-to-digital converter.

7. The system of claim 4 wherein the analog-to-digital converter has at least a 20 MHz sampling rate and a resolution of at least 10 bits.

8. The system of claim 6 wherein a memory-less logarithm amplifier performs the signal compression operation.

9. The system of claim 1 wherein the receiver has a center frequency of at least 30 MHz and a bandwidth of at least 4 MHz.

10. The system of claim 1 further including an antenna connected to the receiver, the antenna comprising a loop lying approximately in the horizontal plane.

11. The system of claim 1 further including antenna means connected to the receiver, the antenna means comprising combinations of horizontal monopoles.

12. The system of claim 1 further including antenna means connected to the receiver, the antenna means comprising combinations of horizontal dipoles.

13. The system of claim 3 in which the signal processing means includes means to compute the autocorrelation function of the received signal, variations in the autocorrelation function being indicative of the time delay.

14. The system of claim 1 including means for storing calibration data obtained by exposing the system to a signal without path difference to correct false echo indications from system imperfections.

* * * * *